(12) United States Patent
Bradd

(10) Patent No.: US 7,397,763 B2
(45) Date of Patent: Jul. 8, 2008

(54) ADMISSIONS CONTROL IN A CONNECTIONLESS COMMUNICATIONS NETWORK

(75) Inventor: Patrick Bradd, Maidenhead (GB)

(73) Assignee: Nortel Networking LLP, St. Laurent, Quebec (CA)

( * ) Notice: Subject to any disclaimer, the term of this patent is extended or adjusted under 35 U.S.C. 154(b) by 125 days.

(21) Appl. No.: 11/355,640

(22) Filed: Feb. 16, 2006

(65) Prior Publication Data

US 2006/0153076 A1  Jul. 13, 2006

Related U.S. Application Data

(63) Continuation of application No. 10/034,521, filed on Dec. 28, 2001, now abandoned.

(51) Int. Cl.
 *H04J 1/16* (2006.01)
(52) U.S. Cl. ............... 370/230; 370/338; 370/392; 370/468
(58) Field of Classification Search ............... 370/230, 370/338, 229, 232, 235, 908, 389, 395.2, 370/395.21, 395.41, 395.53
See application file for complete search history.

(56) References Cited

U.S. PATENT DOCUMENTS

2003/0123388 A1* 7/2003 Bradd .................. 370/230

* cited by examiner

*Primary Examiner*—Chi Pham
*Assistant Examiner*—Alexander O. Boakye
(74) *Attorney, Agent, or Firm*—Barnes & Thornburg LLP

(57) ABSTRACT

A method of providing call admission control which does not require using MIDCOM protocol methods, Packetcable protocols or COPS-RSVP s approaches is described which is simple to implement, cost-effective and which is able to deal with particular situations such as conference calls. Each link in a communications network over which it is required to perform call admissions control is provided with a middlebox connected at each end of that link such that admissions control can be carried out at one end of the link. Call services are provided by Call Servers, each of which has access to a database containing pre-specified information about all middleboxes in that call server's realm. The database also has information about maximum bandwidths for the link associated with each middlebox. The call servers are used to keep a running tally of the amount of VoIP call bandwidth associated with each middlebox on the edge of a low-bandwidth link, and to accept or refuse calls on the basis of the bandwidth information on a per-call basis.

25 Claims, 10 Drawing Sheets

ADMISSIONS CONTROL IN A CONNECTIONLESS COMMUNICATIONS NETWORK

RELATED APPLICATION

This application is a continuation of U.S. patent application Ser. No. 10/034,521, filed Dec. 28, 2001 and now abandoned.

FIELD OF THE INVENTION

The present invention relates to a method and apparatus for admissions control in a connectionless communications network.

BACKGROUND TO THE INVENTION

Admissions control is a significant problem in communications networks and especially in connectionless, packet-based, communications networks. For example, consider a particular link in a communications network. If that link becomes congested, the traffic is unable to flow through the link and packets are dropped. This results in deterioration in quality of service for all services provided over that link. In particular situations this has especially severe impact, for example, when the link provides the main access route from a communications network of a particular enterprise or residential customer to a core communications network.

These problems are particularly relevant for voice over internet protocol (VOIP) solutions. If a link is already carrying the maximum number of VOIP calls, or other non-voice traffic, adding additional calls seriously degrades the voice quality of existing calls using that link. The new call added to the link also has poor voice quality. Continuing to add calls to the link degrades the quality of all calls until none of those calls are recognisable.

The term "Voice over Internet Protocol call" is used herein to refer calls involving any suitable type of media over internet protocol. For example, speech calls, fax calls, modem calls or video calls.

FIG. 4 shows a voice over internet protocol (VOIP) communications network in which admissions control is required. A local area network 40 (LAN), or any suitable type as known in the art, is connected via an access link A to a core communications network 42. Any suitable type of access link can be used as is known in the art, for example, Gigabit Ethernet, Digital Subscriber, or leased line. However, link A is unable to support calls into the core from all endpoints in the LAN simultaneously. Those endpoints are said to be "concentrated" behind link A. Concentration can be implemented in network designs for example where many of the calls are anticipated to stay on the LAN behind an access link to a core network and/or where not all of the endpoints will need to make calls into the core network at the same time. In this way a customer's LAN may be connected to a core network via a single access link that supports both voice and data at the same time. In such situations there is a need to detect when over utilisation of the access link is likely to occur in order that preventative measures can be taken. However there are currently no suitable methods for detecting link over-utilisation and communicating this to a call server or other management node in order that link over-utilisation can be prevented.

Another example is illustrated in FIG. 5. In this case an enterprise network 50 is connected via a fixed wireless link 51 to a core network 52. The fixed wireless link has limited bandwidth and is unable to support calls from all endpoints in the enterprise network at one time. In addition varying amounts of bandwidth are required for calls, depending on the type of call required (e.g. voice calls can use a multitude of different codecs, each of which have their own bandwidth characteristics, fax call, etc.) and this further increases the complexity of the admissions control problem.

One known form of admissions control for the "access" portion of a network is found in the Packetcable (Trade Mark) standards for dynamic quality of service (DQOS). Packet Cable is a set of protocols developed by Cable Television Laboratories, Inc. The protocols are designed to enable quality of service enhanced communications using packetised data transmission technology to a subscriber's home over the cable network. A network superstructure that overlays the two-way data-ready digital cable television network is used. The Packetcable protocols are thus specifically designed for such cable television networks. Another disadvantage of these protocols from the point of view of admissions control is that all the internet protocol media endpoints (e.g. user terminals and other packet media endpoints) and devices on the edge of low-bandwidth links (i.e. in the Packetcable architecture, the CMTS) are required to fully support the reservation protocol (RSVP). In addition those endpoints and devices are required to support mechanisms to send and receive session identifier information from a call server. Also the call server and the devices at the edge of the low bandwidth link need to support the common open policy service (COPS) protocol. This is problematic because many existing communications networks are formed from equipment made by different manufacturers and where many of the nodes or endpoints do not support RSVP or COPS where needed. In addition, the Packetcable protocols require all layer-3 aware devices in a media path to support RSVP in order that call admission control can be effected. However, this is not the case for many communications networks. For example, FIG. 5 shows a low-bandwidth link 51 where nodes at either end of that link are only layer-2 aware devices. Therefore Packetcable protocol type call admission control mechanisms would not be effective. Other disadvantages of the Packetcable approach to call admission control include that no support for layer 2 flows is provided and the fact that all devices in the network which support RSVP are required to have some policy awareness.

The reservation protocol is defined in the Internet engineering task forces' request for comments (RFC) 2205 whilst COPS is defined in RFC 2748.

The known approach to call admissions control mentioned above which uses the Packetcable standards is now described in more detail. This approach involves the Common Open Policy Service (COPS) with RSVP. An example of a typical architecture for COPS and RSVP admissions control is given in FIG. 6 which shows two access networks connected to a core communications network via Policy Enforcement Points (PEPs). The core network comprises a policy decision point (PDP) and a call server. Using this approach, the originating and terminating parties make an admissions request to the call server using H.248, or any other suitable device control protocol such as media gateway control protocol (MGCP) or NCS where NCS is the Packetcable specific version of MGCP as indicated in FIG. 6. The call server then grants an appropriate service ticket to each of those parties. Next, the originating party or originating PEP spawns a network admission request through the network. A similar request is spawned by the destination party or destination PEP to request a call flow in the opposite direction and so provide a 2-way flow. The PDP receives the admission requests and forwards those to the call server.

The call server verifies the service tickets. The PDP decides whether to accept or refuse the request on the basis of available bandwidth on the low-bandwidth access link and if accepted, opens a reserved path for media for the new call. However, the COPS and RSVP approach is problematic because significant post dial delay occurs as a result of the admission process and also the other problems mentioned above with respect to the Packetcable approach apply; In addition, the means by which the call server and PDP communicate is not yet fully standardized.

More recently the Internet Engineering Task Force (IETF) have set up a working group to consider ways in which middleboxes can be controlled. The term "middlebox" is used herein to refer to an entity in a communications network which is associated with a low-bandwidth link and which is able to allow or disallow individual traffic flows over that link. For example, the middlebox may be a node connected to one end of a low-bandwidth link. Also, the middlebox may be part of a node which is not directly connected to one end of a low-bandwidth link but which is able to allow or disallow individual traffic flows over that link. The IETF working group is referred to as the MIDCOM (middlebox communications) working group. In the future it may be possible to use protocols developed by the MIDCOM working group to control such middleboxes in order that they themselves perform admissions control. However, these MIDCOM protocols are not yet developed and ratified. Indeed, we understand that the MIDCOM working group is currently working on the control of middleboxes for network address translation and firewall purposes, but not for admissions control purposes. It will be some time before this is the case and those protocols are deployed on all the required nodes in existing communications networks. In addition such MIDCOM methods would require a means by which a call server is automatically able to identify which middleboxes are relevant for a particular call. However, "middlebox discovery" mechanisms like this are not currently known.

Thus a means of providing call admission control which does not require using MIDCOM protocol methods, Packetcable protocols or COPS-RSVP approaches is required which is simple to implement, cost-effective and which is able to deal with particular situations such as conference calls, lawful intercept (known in North America as CALEA), and other potential call service situations is required.

The invention seeks to provide an improved method and apparatus for performing admissions control which solves or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

A method of providing call admission control which does not require using MIDCOM protocol methods, Packetcable protocols or COPS-RSVP approaches is described which is simple to implement, cost-effective and which is able to deal with particular situations such as conference calls and/or lawful intercept. Each link in a communications network over which it is required to perform call admissions control is provided with a middlebox connected at each end of that link such that admissions control can be carried out at one end of the link. Call services are provided by Call Servers, each of which has access to a database containing pre-specified information about all middleboxes in that call server's realm. The information in the database is manually configured for example although this is not essential. The database also has information about which media endpoints are behind what middle box, and maximum bandwidths for the link associated with each middlebox. The call servers are used to keep a running tally of the amount of VoIP call bandwidth associated with each middlebox on the edge of a low-bandwidth link, and to accept or refuse calls on the basis of the bandwidth information on a per-call basis According to a first aspect of the present invention there is provided a call server for use in a connectionless, packet, communications network in order to provide admissions control, said communications network comprising a plurality of middleboxes, each middlebox being associated with a different link in the communications network and arranged to control packet flow over that link, said call server comprising:

an input arranged to receive a call admission request from an originating packet media endpoint, said call admission request comprising information about the originating packet media endpoint, and a destination packet media endpoint;

an input for accessing information about all first middleboxes associated with the originating node and all second middleboxes associated with the destination node, together with information about the amount of available bandwidth on the link associated with each of those middleboxes;

a processor for determining whether to accept the call admission request on the basis of the accessed information about available bandwidth;

an output arranged to output the results of the determination as to whether to accept the call admission request.

This provides the advantage that the call server effectively provides admission control capability on behalf of the middleboxes. Because the call server is able to access information about middleboxes and the available bandwidth on the low-bandwidth links associated with those middleboxes it is able to perform call admission control. This is achieved without the need to modify existing packet media endpoints such as media gateways and internet protocol endpoints. In addition, it is not necessary for those packet media endpoints to be fully RSVP enabled or for the middleboxes to be MIDCOM enabled with respect to call admissions control. Another advantage is that call admission control over the low-bandwidth links is achieved even where nodes at either or both ends of the low-bandwidth link are layer-2 but not layer-3 aware. This is because effectively the call server performs the admission control determinations.

The information about the destination packet media endpoint is preferably provided by a destination or called party number representing the packet media endpoint.

Preferably the processor is arranged to determine whether to accept the call admission request on the basis of the accessed information about available bandwidth together with information about the bandwidth requirements for the call. For example, a pre-specified value of the bandwidth requirements for any call can be used. Alternatively the call server can determine what bandwidth is needed as explained in more detail below.

Preferably the processor is further arranged to determine whether all the first middleboxes are the same as all the second middleboxes and to accept the call admission request in such cases. This provides the advantage that when the call path does not traverse a low-bandwidth link associated with a middlebox then the call is simply accepted.

Advantageously said processor is further arranged to identify which of the first middleboxes are not also second middleboxes and vice versa, and wherein said processor is arranged to determine whether to accept the call admission request on the basis of accessed information about available bandwidth only for links associated with those identified middleboxes. This ensures that when the call path or flow does traverse one or more low-bandwidth links associated with middleboxes, then call admission control is performed for each of those links.

According to another aspect of the present invention there is provided a method of performing admissions control in a connectionless, packet, communications network, said communications network comprising a plurality of middleboxes, each middlebox being associated with a different link in the communications network and arranged to control packet flow over that link, said method comprising the steps of, at a call server:

receiving a call admission request from an originating packet media endpoint, said call admission request comprising information about the originating packet media endpoint and a destination packet media endpoint;

accessing information about all first middleboxes associated with the originating packet media endpoint and all second middleboxes associated with the destination packet media endpoint, together with information about the amount of available bandwidth on the link associated with each of those middleboxes;

determining whether to accept the call admission request on the basis of the accessed information about available bandwidth; and outputting the results of the determination as to whether to accept the call admission request.

The communications network is preferably an internet protocol communications network at layer 3. At layer 2, a variety of protocols could be used, such as ATM, Ethernet, PPP, etc. A variety of layer 1 physical layers can also be provided. The calls are preferably voice over internet protocol calls.

The middle boxes at both ends of the low-bandwidth link are arranged to use quality of service (QOS) mechanisms as known in the art to prioritise VoIP traffic from other non-VoIP traffic accessing the low-bandwidth link. This is accomplished using well known classification techniques such as packet marking, port based, VLAN based, etc., as well as traffic shaping, and traffic dropping as known in the art. The end-result is that the voice traffic always has priority over non-voice traffic. If there is ever voice traffic to be sent, it is always sent over the low-bandwidth link ahead of non-voice traffic. This results, essentially, in the voice traffic having complete access to all the available bandwidth on the access link. The term "voice traffic" is used here and in the document as a whole to refer to any suitable type of media in a voice over IP call, for example, speech, fax, video and modem.

Preferably said information about bandwidth requirements for the call comprises session description protocol (SDP) information received from both the originating and destination packet media endpoints. SDP is specified in the IETF's RFC number 2327. This provides a simple and effective means by which bandwidth requirement information can be obtained by the call server on a per-call basis. The call server is also able to adjust the bandwidth requirements used for the call if these requirements change in the SDP information, for example, as codec requirements are negotiated between the packet media endpoints during call setup time, prior to answer. (A codec is a device for converting speech into signals suitable for transfer by a packet based protocol.) Even post-answer, it is possible to use SDP changes to change the codec being used, and the call server is preferably arranged to take this into account when doing admissions control. Suppose that the call server detects a change to a new codec that requires more bandwidth than previously required for a call. In that case, if there is not enough bandwidth on a link used in this call to change to the new codec, then the Call Server is preferably arranged to force the call to remain at the current, un-modified bandwidth.

In one embodiment said call is a voice call and said information about bandwidth requirements for the call comprises information about one or more codecs to be used in the call. Also, the call may be a conference call to be established using a conferencing service in the communications network. In addition the call may be subject to lawful intercept as explained in more detail below.

In another embodiment the communications network comprises two or more call servers, and wherein said method further comprises: receiving said call admission request at an origination call server associated with the origination packet media endpoint and determining whether a destination call server, associated with the destination packet media endpoint is the same as the origination call server. This provides the advantage that admissions control for calls which traverse realms of more than one call server can be carried out.

Advantageously, when said determination indicates that the destination call server and the origination call server are different, the method comprises allowing the origination and destination packet media endpoints to negotiate as to a codec to be used for the call and to send information about that codec to both the origination and destination call servers. This codec can be used to determine an indication of bandwidth requirements for the call based on the codec information. Preferably, the negotiation about which codec to use is accomplished using known methods such as via session initiation protocol (SIP) or SIP-T. These protocols are able to carry SDP information regarding the call between the origination and destination call servers as described below.

Preferably, for all middleboxes associated with the origination packet media endpoint, the origination call server accesses information about available bandwidth and for all middleboxes associated with the destination packet media endpoint, the destination call server accesses information about available bandwidth.

Furthermore, if the call request is refused, instructions are sent to the origination packet media endpoint to provide a refusal indication to a calling party terminal which initiated the call request.

Also, if the call request is accepted, a database of middlebox information is updated with information about the call and updated again when that call ends.

Advantageously, one or more of said middleboxes are arranged to perform call admission control themselves under MIDCOM protocol control. This means that the method of the present invention can be implemented in communications networks which contain a mixture of MIDCOM enabled and non-MIDCOM enabled equipment. However the present invention does not seek to provide a MIDCOM protocol based solution although some embodiments of the present invention are operable in networks which contain a mixture of MIDCOM enabled and non-MIDCOM enabled equipment.

The invention also encompasses a communications network comprising at least one call server as specified above. Preferably, every originating and every destination packet media endpoint connected to a particular middlebox is controlled by the same call server. By specifying requirements for network topology in this way it is possible to use a simplified method of call admissions control as described herein.

The invention also encompasses a computer program arranged to control a call server such that the method specified above is carried out. Any suitable programming language may be used for the computer program as is known in the art.

The preferred features may be combined as appropriate, as would be apparent to a skilled, person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "low bandwidth link" is used to refer to a connection between two nodes in a communications network, where the capacity of the link is less than the capacity required should all entities connected to one end of the link issue communications over that link simultaneously. Typically there is only one such low bandwidth link between the two nodes referred to immediately above although this is not always the case.

The term "packet media endpoint" is used to refer to a terminal that is suitable for connection (possibly indirectly) to a middlebox or to refer to a node via which terminals access a middlebox (e.g. a media gateway). The term "call agent" is used to refer to a node which is able to control a middlebox via the MIDCOM protocol. For example, a call server or a media gateway controller may be a call agent if these entities are MIDCOM enabled. In the present invention it is not essential for the call server to be MIDCOM enabled and in a preferred embodiment it is not MIDCOM enabled.

The present invention addresses the problem of admissions control by using a call server which has access to a pre-configured database of information about middleboxes and the available bandwidths at the low-bandwidth links associated with those middleboxes. By using pre-configured information in this way, a simple and effective means of call admission control is obtained and there is no need to make changes to existing IP media endpoints or to have MIDCOM enabled middleboxes. In addition, by specifying particular requirements for network design and topology it is possible to deal with situations in which more than one call server is involved. It is also possible to deal with complex service interactions such as conference calls and lawful intercept. In addition, the solution works for low bandwidth links where the edges of the low bandwidth link (i.e. the middle boxes) are capable of looking at either the layer 2 or layer 3 of the flow.

Figure 1:
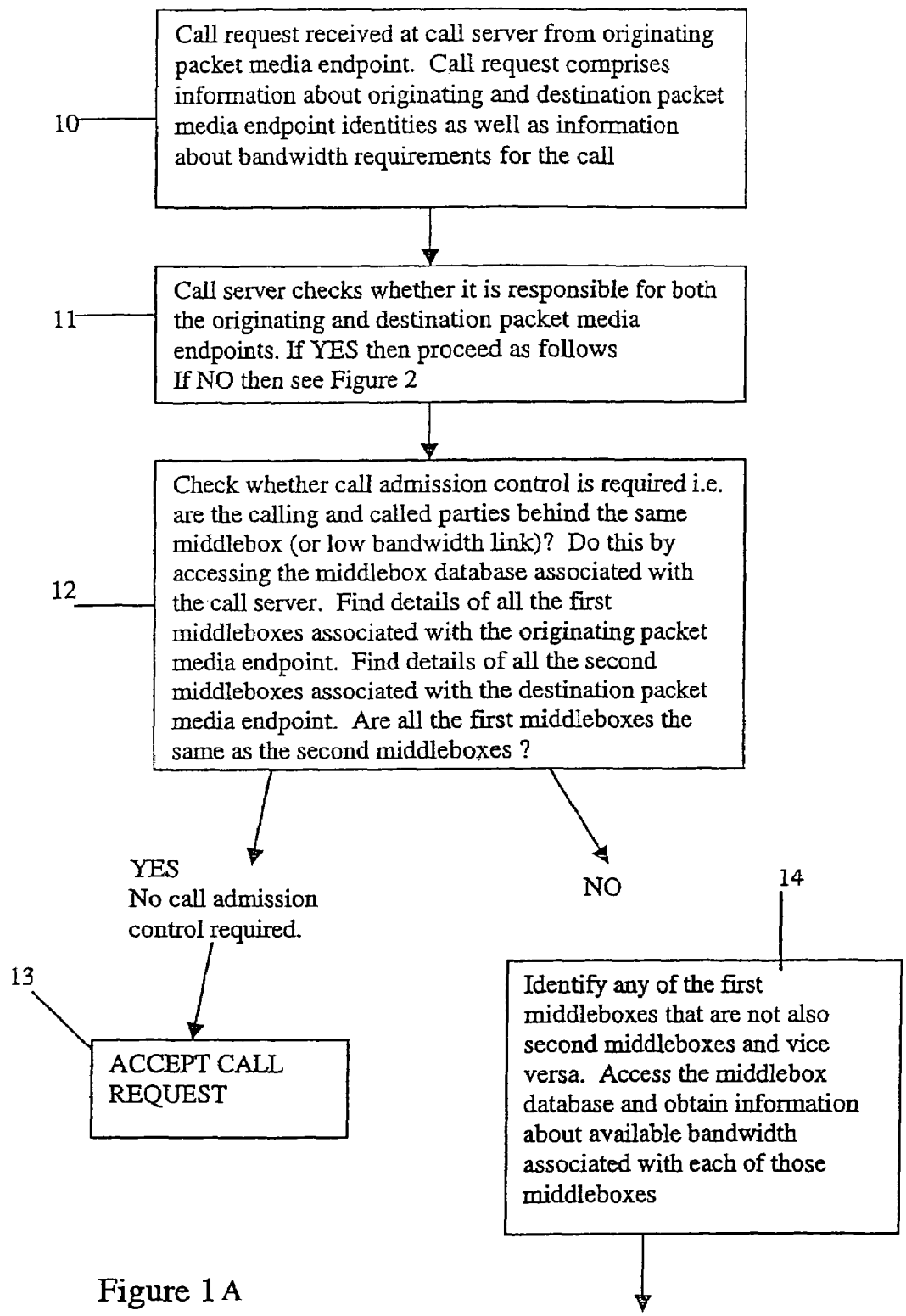
FIGS. 1A and 1B are a flow diagram of a call admission control method according to an embodiment of the present invention.
Figure 1B:
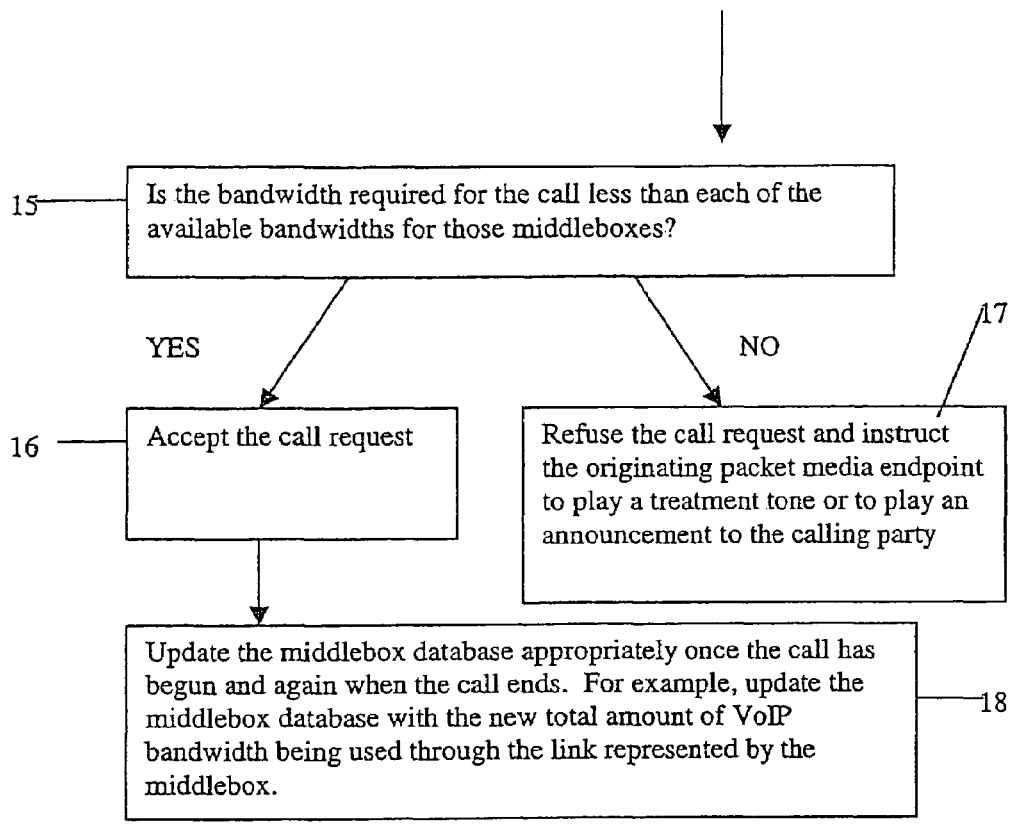
Figure 2A:
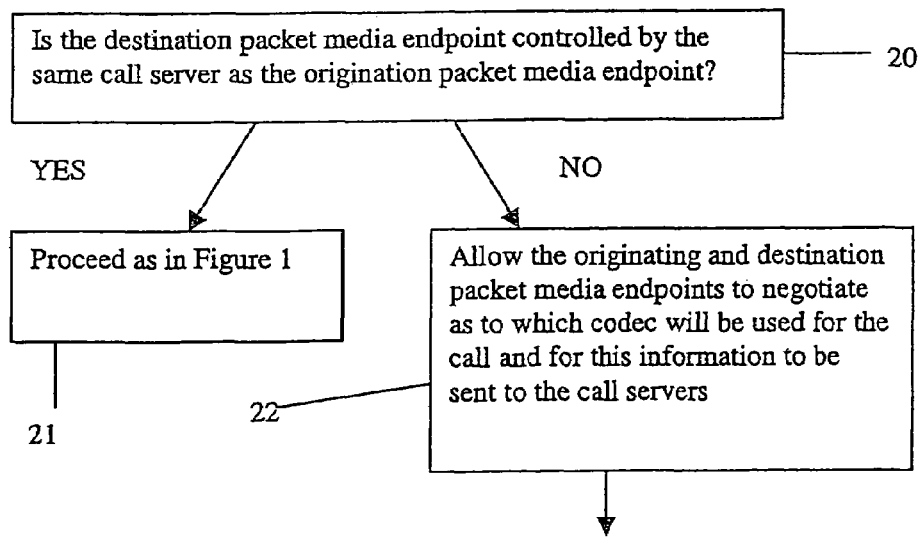
FIGS. 2A and 2B are a flow diagram of another call admission control method according to another embodiment of the present invention.
Figure 2:
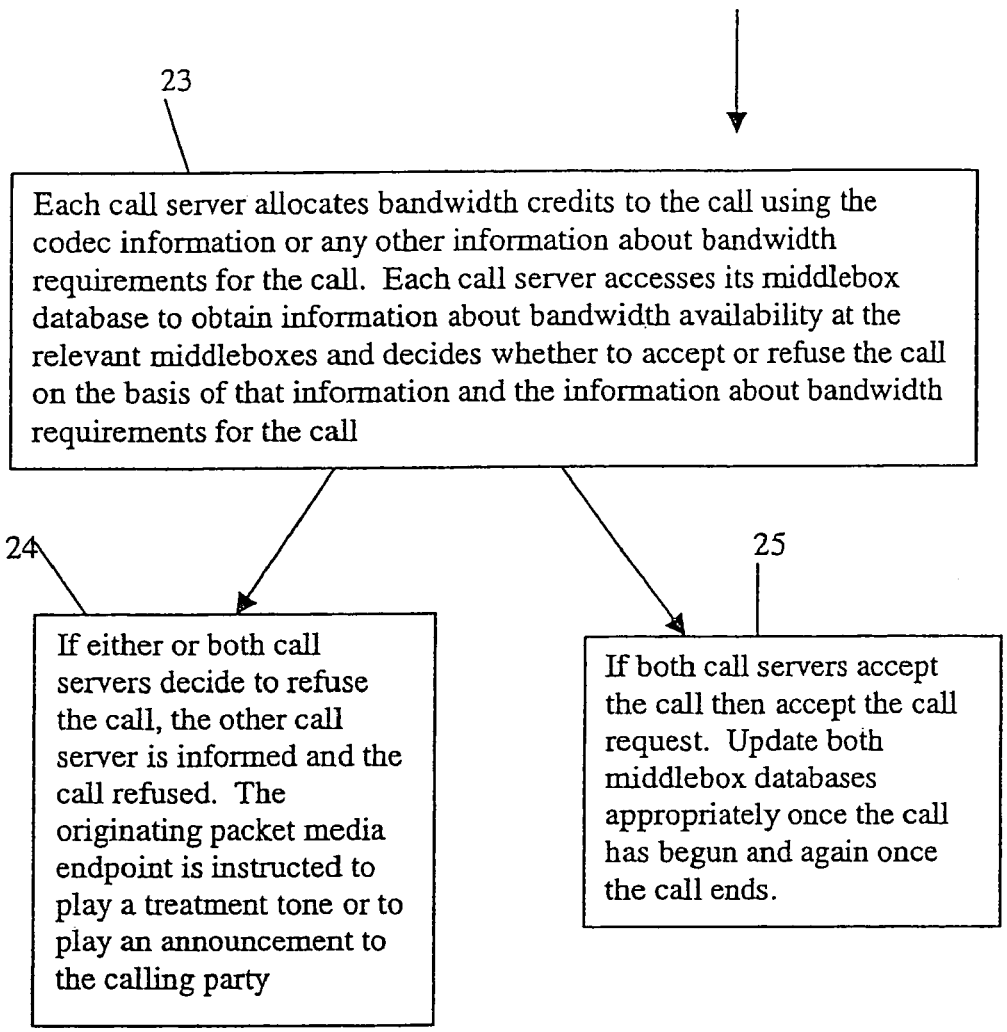
Figure 3:
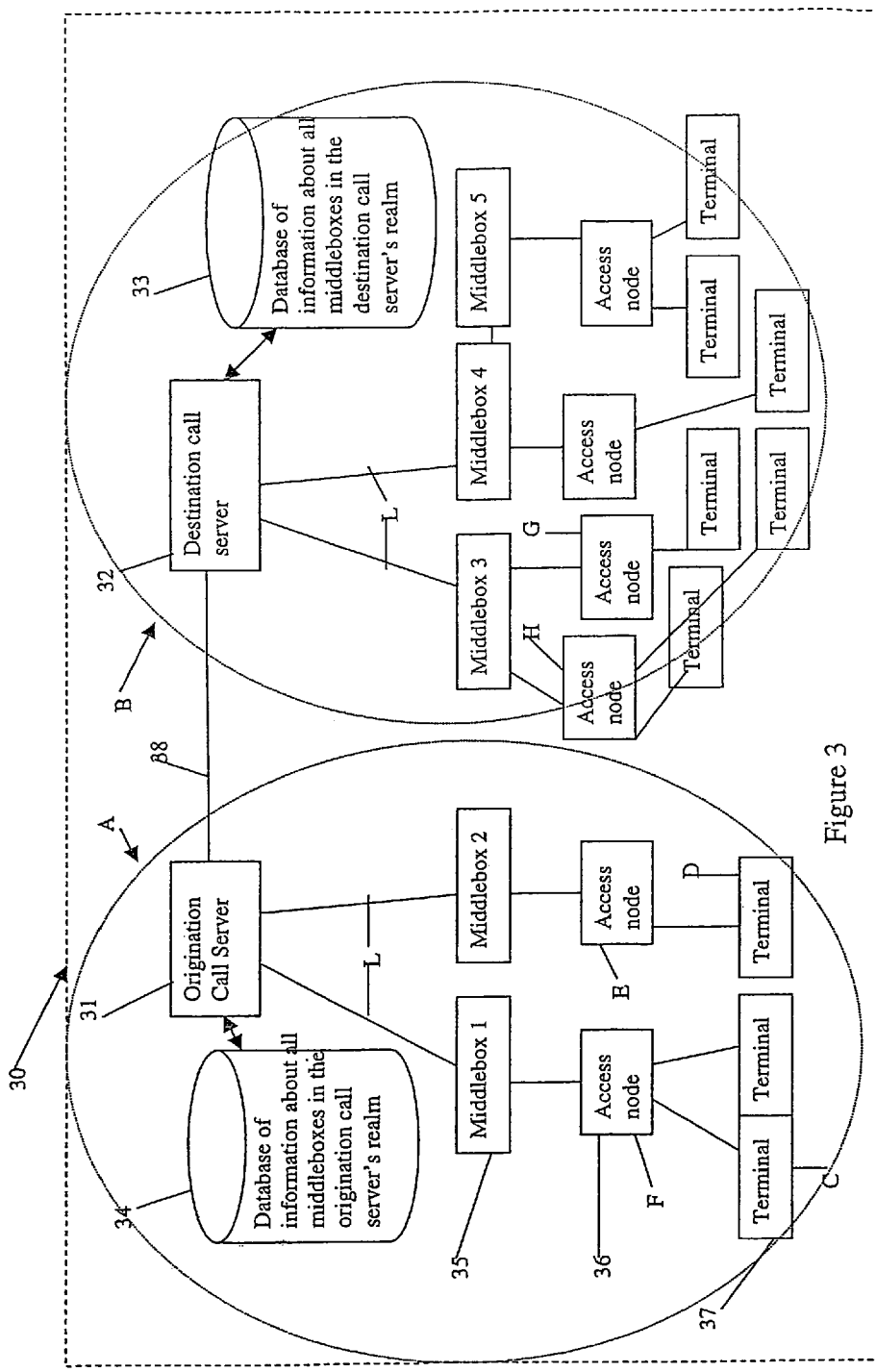
FIG. 3 is a schematic diagram of a communications network comprising a call admission control system.
Figure 4:
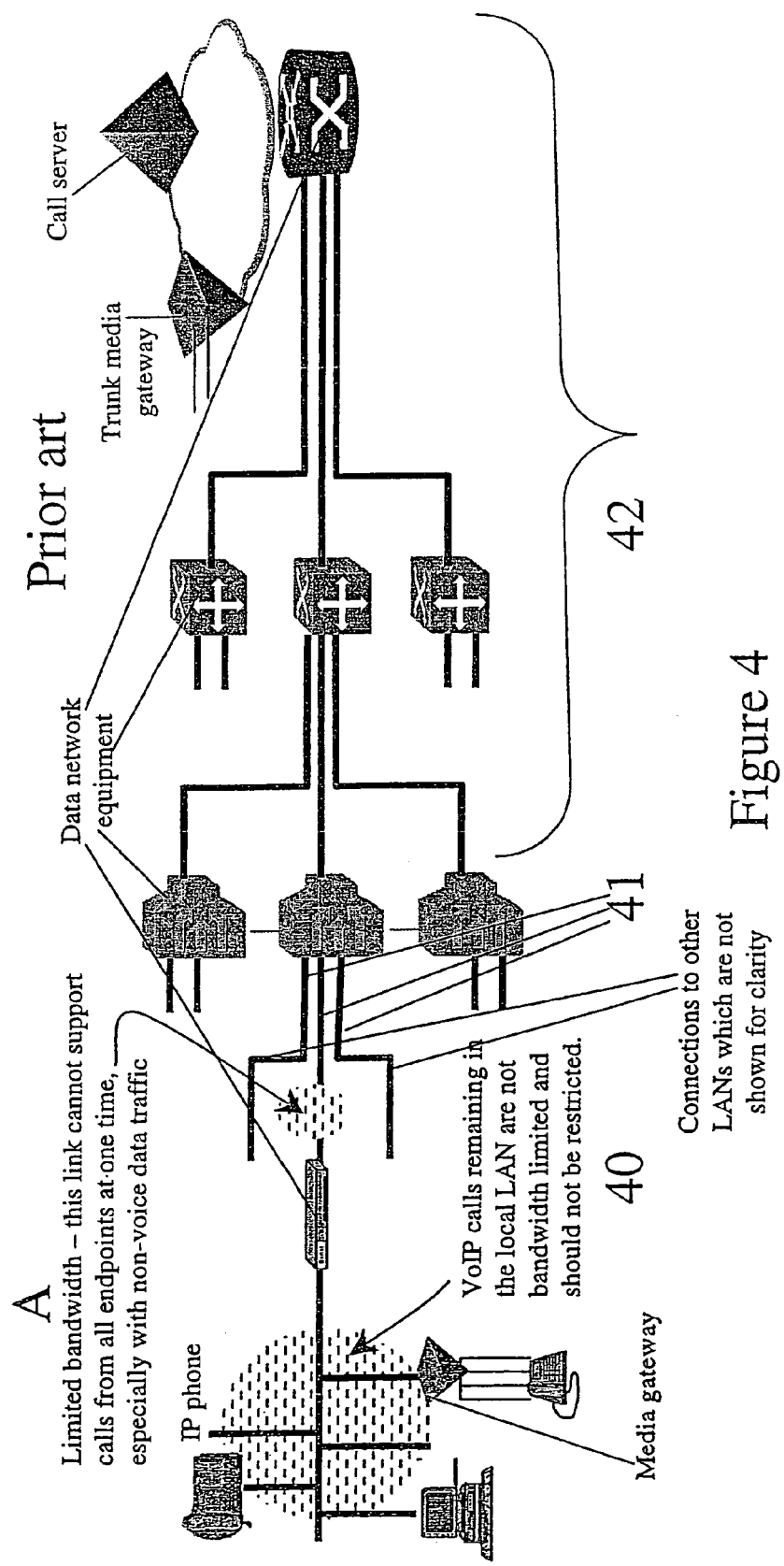
FIG. 4 is a schematic diagram of a prior art voice over internet protocol (VoIP) communications network.
Figure 5:
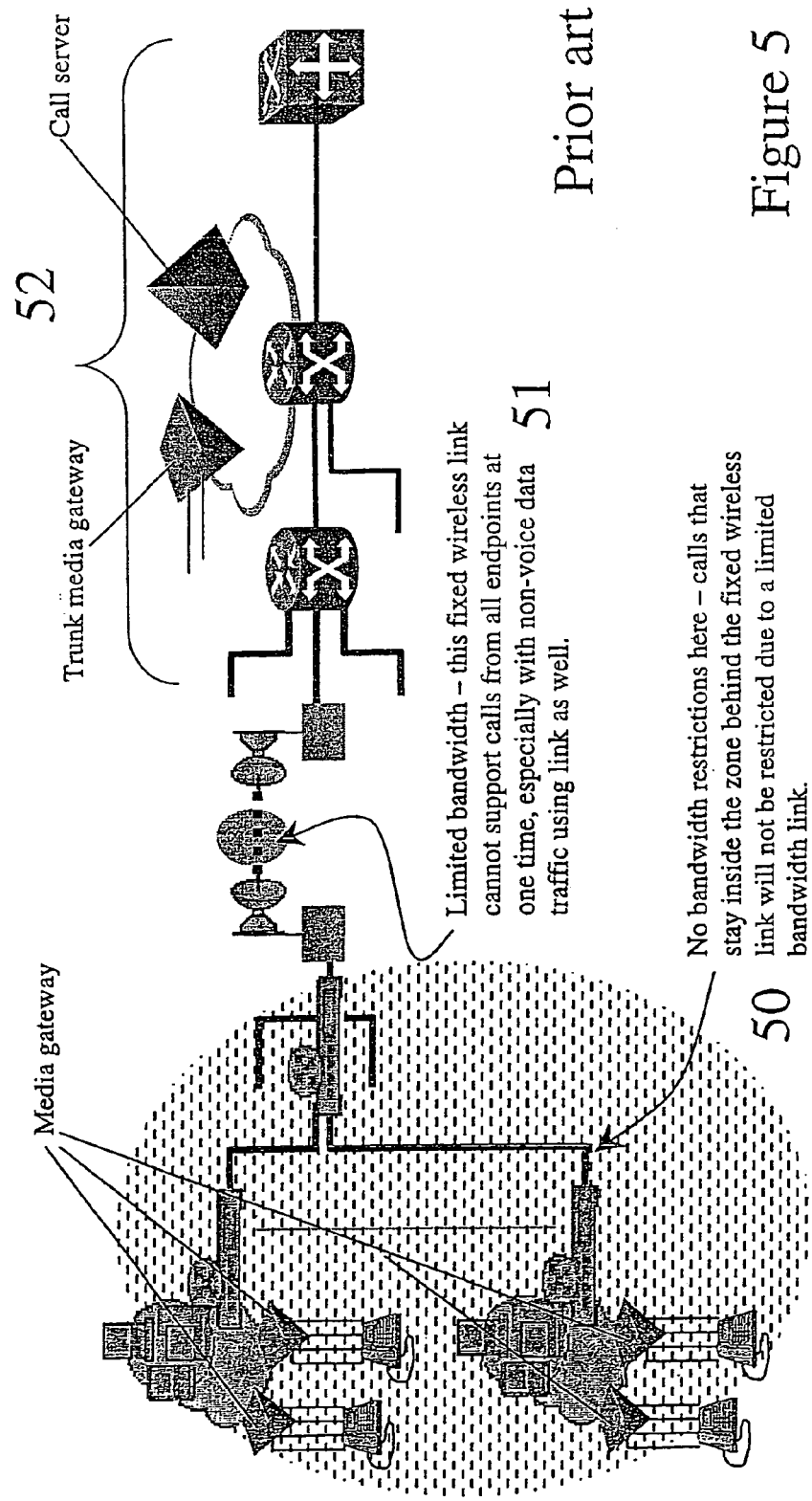
FIG. 5 is a schematic diagram of a prior art voice over internet protocol (VoIP) communications network.
Figure 6:
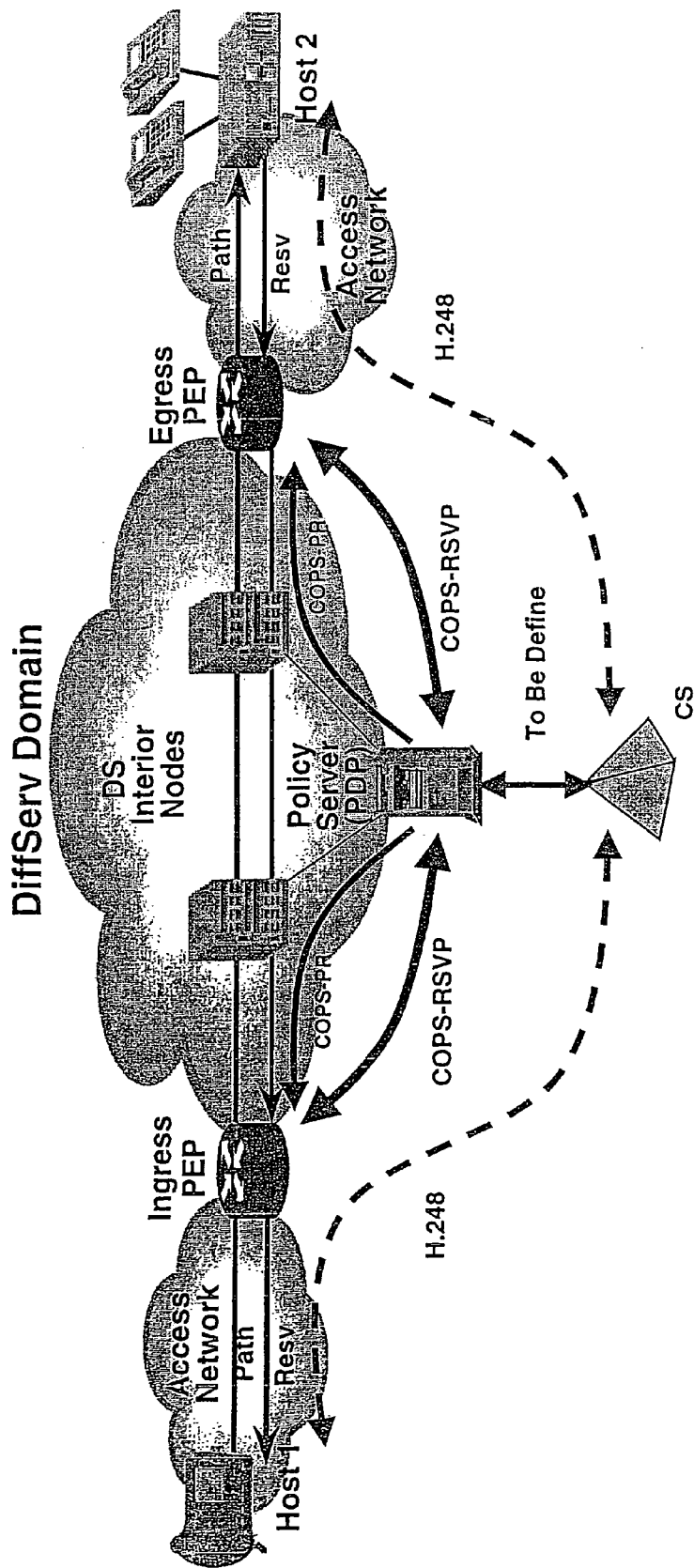
FIG. 6 is a schematic diagram of a typical COPS and RSVP admissions control architecture according to the prior art.

This is now explained in more detail with reference to FIGS. 1, 2 and 3. FIG. 3 gives a schematic diagram of a communications network comprising a call admission control system according to the invention and FIGS. 1 and 2 are flow diagrams of methods of call admission control in the network of FIG. 3.

FIG. 3 shows a Voice over IP communications network 30 comprising a plurality of nodes interconnected by links and for clarity only some of the nodes and links are shown. The communications network 30 comprises one or more call servers and in this example two call servers 31, 32 are shown and these are interconnected by link 38, which may be indirect and which uses a suitable protocol such as SIP-T for inter-call-server communication. Each call server 31, 32 is associated with one or more middleboxes 35; that is, the call server is able to control packet media endpoints that are behind those middleboxes with which the call server is associated. As explained above each middlebox is connected (possibly indirectly) to one or more packet media endpoints 36 and those packet media endpoints are connected to one or more terminals via which users are able to access the communications network. It is also possible for a single packet media endpoint to be connected behind more than one middlebox and thus more than one low bandwidth link although this is not shown in FIG. 3 for reasons of clarity.

Considering an individual call server, this is used to provide services to terminals connected to packet media endpoints. For example, in FIG. 3, call server 31 can be thought of as serving realm A and being associated with the middleboxes, packet media endpoints and terminals in its realm. Similarly call server 32 serves realm B. The two call servers 31, 32 are connected to one another either directly or indirectly. Communication between call servers 31, 32 is accomplished through the use of a well known inter-call-server communication protocol such as SIP-T as known in the art.

Accessible by each call server is a database or other information store 33, 34. These contain pre-specified information about all the middleboxes in the particular call server's realm. This information comprises:

For each middlebox in the realm, which packet media endpoints are associated with that middlebox, as well as, for each packet media endpoint, what the associated middlebox is;

For each middlebox in the realm the maximum possible bandwidth of the low-bandwidth link associated with that middlebox;

For each middlebox in the realm the current available bandwidth on the associated low-bandwidth link;

Optionally, information about whether each middlebox supports MIDCOM based protocol admissions control.

With reference to FIG. 1, when a call request is made by a user of a terminal, a call request message is sent from that terminal to the associated call server via an packet media endpoint and one or more middleboxes. The call request message is preferably in the form of a device control call origination message using a protocol such as H.248, media gateway control protocol or any other suitable protocol as known in the art.

The call request takes place in multiple stages although this is represented in FIG. 1 as one stage for clarity. The stages of the call request are known in the art and the exact details depend on the particular device control protocol used. An outline of the type of steps involved is:

Offhook from packet media endpoint to call server.
Call server tells packet media endpoint to create connection and collect digits.
Packet media endpoint tells call server the preferred bandwidth requirements for the call as well as IP addressing details, etc. (i.e. SDP information).
Packet media endpoint sends digit information to the call server and the call server uses this to form the destination packet media endpoint identity.

For example, consider a call request from terminal C in FIG. 1. The request message would proceed to packet media endpoint F, through middlebox 1 and to origination call server 31. The call request message contains information about the call destination as well as the origination and destination packet media endpoints (as mentioned above) and also information about the bandwidth requirements for the call (see box 10 of FIG. 1).

The origination call server 31 next checks whether the origination and destination packet media endpoints are both in its realm (see box 11 of FIG. 1). For example, if the destination party is terminal D in FIG. 3 then this is the case; the origination packet media endpoint F and the destination node E are both in realm A. In such cases the method proceeds as in FIG. 1; otherwise the method of FIG. 2 is adopted.

Considering the case where the method of FIG. 1 applies, the call server next checks whether call admission control is required. For example, if the origination and destination terminals are both served by the same packet media endpoint, then the call does not need to flow over a low bandwidth link and so no call admission control is needed. In order to check this, the call server 31 accesses its middlebox database 34. Details of all first middleboxes associated with the origination packet media endpoint are found. For example, these could be middlebox 1 in FIG. 3. Then details of all second middleboxes associated with the destination packet media endpoint are found. These could be middlebox 2 in FIG. 3. The call server 31 then checks these two sets of middleboxes for any items which are only in one of the sets. If all of the first middleboxes are the same as the second middleboxes then no call admission is required (see boxes 12 and 13 of FIG. 1) and the call request is accepted. Otherwise, any first middleboxes which are not also second middleboxes and vice versa are identified. For each of these middleboxes information about currently available bandwidth is obtained (see box 14 of FIG. 1).

If the bandwidth required for the call is less than each of the available bandwidths for those middleboxes then the call is accepted (see boxes 15 and 16 of FIG. 1). Otherwise the call is refused (see box 17 of FIG. 1). For example, consider a call from terminal C to terminal D. The low bandwidth links associated with both middleboxes 1 and 2 have to have enough available capacity for the proposed call. (The call server may not have empirical information about the available bandwidths but instead may use a counter or token system representing units of bandwidth or any other suitable scheme for indicating the relative amount of bandwidth).

When a call is accepted, the appropriate middlebox database is updated once the call begins and when the call ends. When a call is refused it is possible for the end user to be informed, for example by sending an instruction from the call server 31 to the destination packet media endpoint to play a special tone or a recorded announcement.

When call admission is barred then it is unlikely that a centralised announcement resource can be used to play an announcement, because of congestion in the network for example. Also, in order to use a centralised announcement resource the call admission control process would need to be carried out again. In view of this a treatment tone is preferably used or an announcement resource at the packet media endpoint itself.

As described with reference to FIG. 1, the call server receives information about the bandwidth requirements for the proposed call. This is preferably achieved via SDP information from the packet media endpoints (as mentioned above). In a preferred embodiment involving VoIP calls, the call server obtains the bandwidth requirement information by examining session description protocol (SDP) messages from each of the packet media endpoints in its realm. These message enable the call server to determine which codecs will be used in the call, as is known in the art. Then, based on the codec to be used in the call, the call-server is able to allocate one or more bandwidth credits to the call. A codec using more bandwidth requires more credits. Thus in this embodiment, the call server also has access to pre-specified information about all possible codecs that may be used in calls in its realm and the amount of bandwidth needed by those codecs.

The method of FIG. 1 thus does not require the middleboxes to have MIDCOM capability and the packet media endpoints may be of any suitable type whether RSVP enabled or not. The method is therefore operable for networks formed from mixed equipment with some entities being MIDCOM controllable and some not if required.

In the case that the destination packet media endpoint is in a different realm from the origination packet media endpoint the method of FIG. 2 is used. The origination call server 31 receives a call request from packet media endpoint E for example, where the destination packet media endpoint is G for example. The call server recognises that packet media endpoint G is not in its realm, but instead in the realm of destination call server 32. This is achieved without reference to the middlebox database. Rather, standard call server translation and routing methods are used as is known in the art to determine that access node G is in the realm of destination call server 32. The origination and destination packet media endpoints are then allowed to negotiate as to which codec will be used for the call (in the case of a VoIP call) as is known in the art. (As explained above, a codec is a device for converting speech into signals suitable for transfer by a packet-based protocol and one or more codecs are associated with each call server.) Information about which codec is to be used is then sent to each of the origination and destination call servers 31, 32 (see box 22 of FIG. 2). This is preferably achieved using standard inter-call-server signalling such as SIP-T as known in the art.

Using the codec information, or other information about bandwidth requirements for the call both call servers 31, 32 allocate bandwidth credits for the call (see box 23 of FIG. 2). That is, each call server determines an indicator of how much bandwidth is needed for the call. Each call server then accesses its middlebox database to check whether the available bandwidth is enough for the call. This is done in a similar way described with respect to FIG. 1. That is, each call server determines which of its middleboxes are involved in the call and checks the available bandwidth on each of the associated low-bandwidth links.

As a result, if any of the call servers decides to refuse the call, the call is refused (see box 24 of FIG. 2). Otherwise, the call is accepted (see box 25 of FIG. 2). If the call is refused a treatment tone or an announcement is made as described above with reference to FIG. 1.

Figure 7:
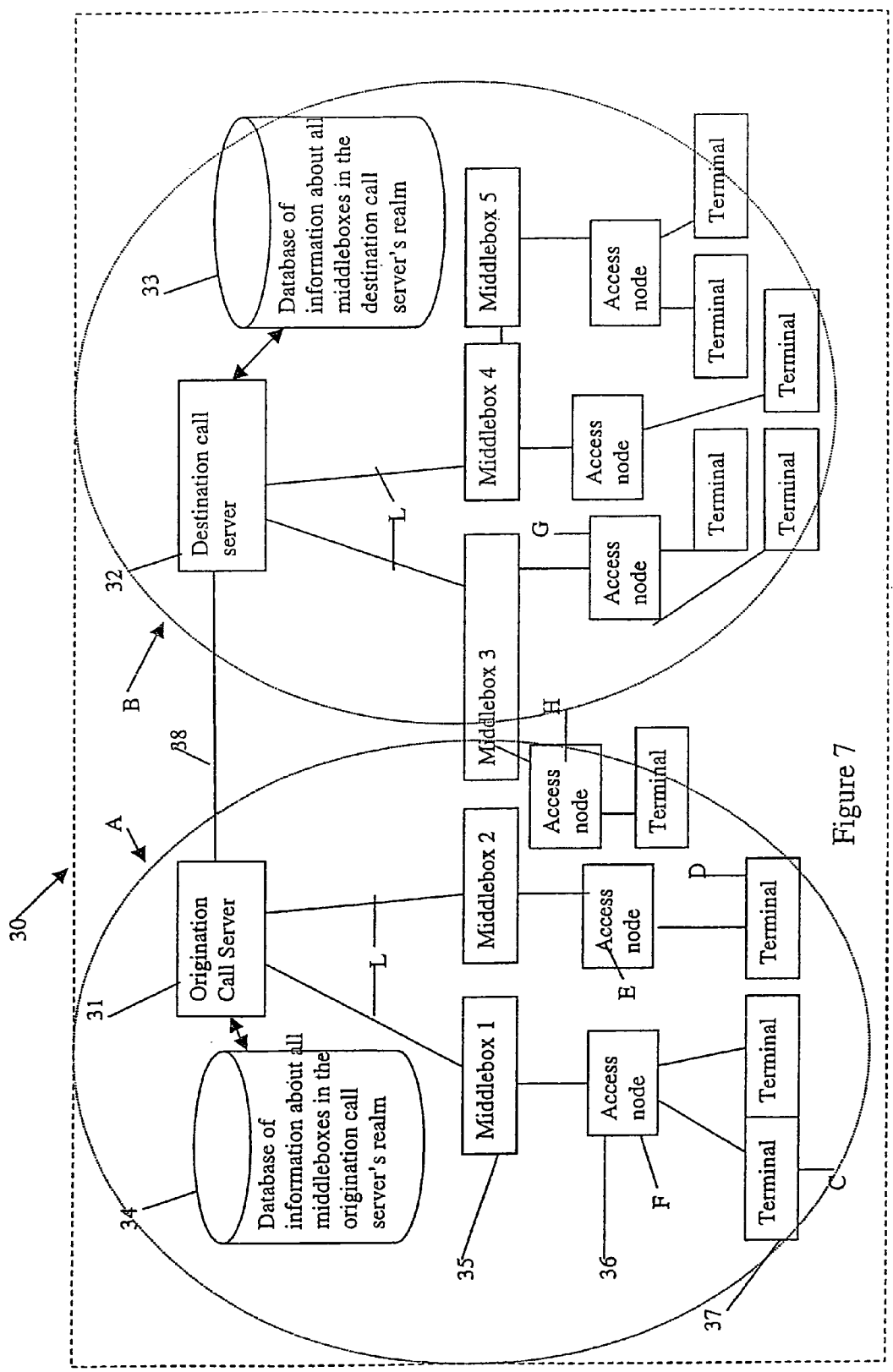
FIG. 7 is a schematic diagram of another communications network comprising a call admission control system.

Thus the method of FIG. 1 involved checking for situations where no call admission control is needed. However, the method of FIG. 2 does not require such a check because the origination and destination packet media endpoints are always different when the call servers are different provided a particular network design is followed. That is, the network design should not have any middleboxes which are members of more than one realm. Such a situation is illustrated in FIG. 7 which is the same as FIG. 3 except that middlebox 3 is in both realms A and B.

In a preferred embodiment, the call server determines whether call admission control is required by using information from the middlebox database. For example, if the middlebox database shows that the access node concerned is behind a middlebox and also if the middlebox database shows that the call server is required to perform call admissions control on behalf of that middlebox.

However it is not essential for the call server to make this determination as described above. Another option is to add an identifier to call request messages as now described.

In order to inform the call server(s) that call admission control is required an identifier may be added to the call request message. This indicates the need for the call server to count the admissions through each middlebox on behalf of those middleboxes. However, in the case that some of the middleboxes are MIDCOM enabled and able to carry out their own call admission control, such an indicator is useful. For example, if the call server knows that a particular middlebox is MIDCOM enabled in that way, it can simply request call admission control from that middlebox.

In a preferred embodiment the call server uses a tag (called CAC-CSCount for example) to note in the middlebox database each middlebox that cannot perform call admission control via MIDCOM. Using the methods of FIGS. 1 and 2 the call server then effectively keeps track (using a counter mechanism) of the amount of bandwidth passing the low bandwidth link connected to the middle boxes as described above. Pre-specified in the middlebox database is information about the maximum amount of bandwidth allowed through the low bandwidth link connected to each middlebox. This information is obtained in any suitable manner, for example by theoretical calculations or by empirical measurement. If the current value of the bandwidth counter would exceed the maximum amount of bandwidth specified then the proposed call is refused.

Figure 8:
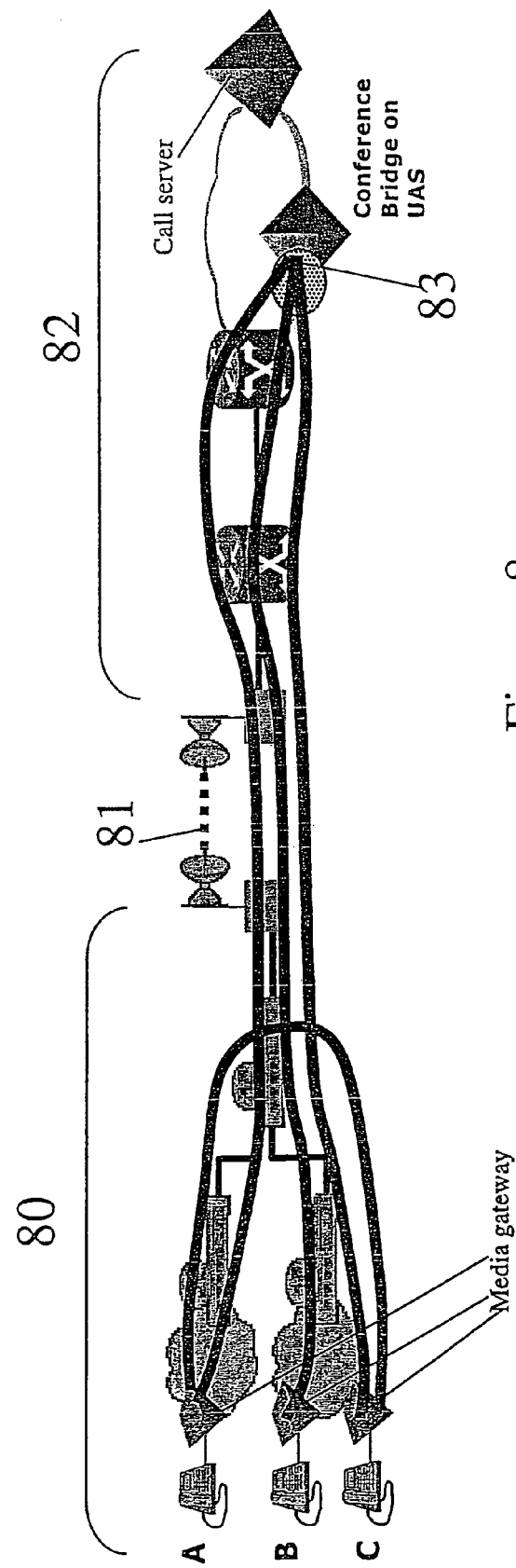
FIG. 8 is a schematic diagram of a communications network comprising a conference bridge and a call admission control system according to an embodiment of the present invention.

The method is also able to deal with situations involving conference calls where a centralised conferencing service is used. For example, consider the situation in FIG. 8 which shows an access network 80 connected to a core network 81 comprising a conference bridge 83 via a low bandwidth link 82. If terminal A sets up a call to terminal C then a call path 84 is established and no admissions control is needed. However, if A proceeds to conference B into the existing call then three 2-way speech paths need to undergo admissions control, one path between each of A, B and C and the conference bridge 83. This is possible using the method of FIG. 1 for each of those paths.

Figure 9:
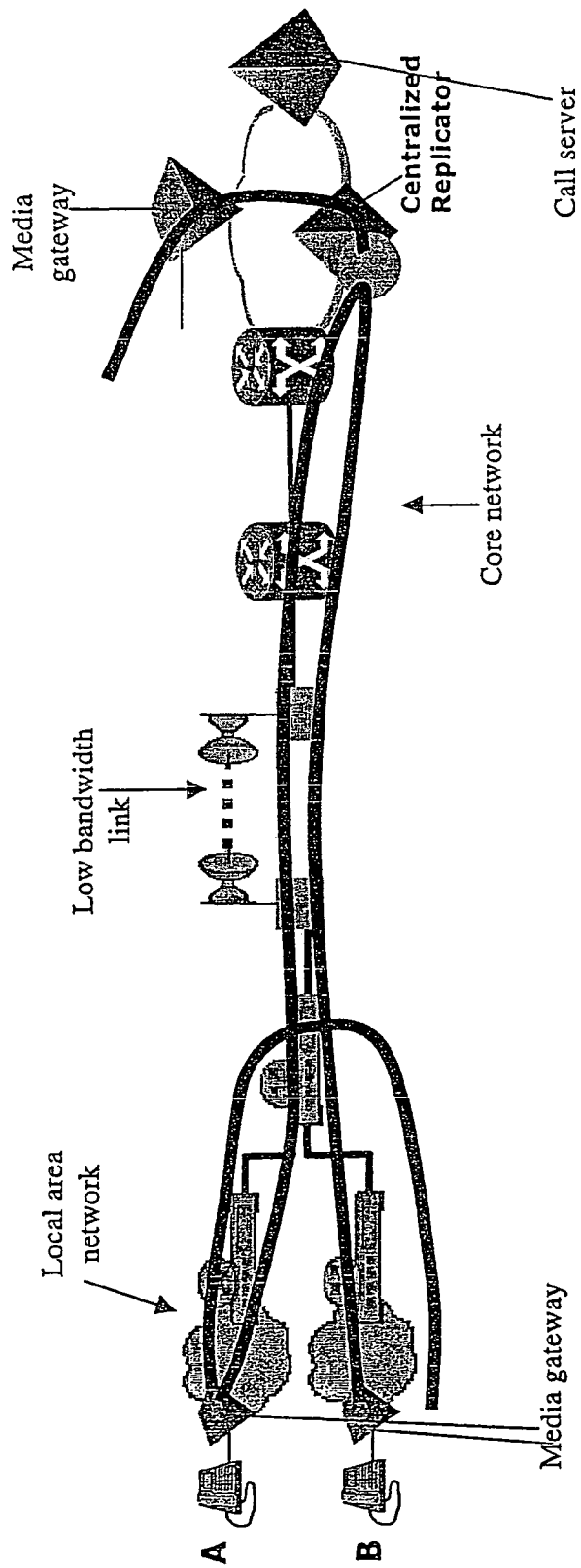
FIG. 9 is a schematic diagram of a communications network comprising a call admissions control system and a lawful intercept system.

The method is also able to deal with situations involving lawful intercept whereby calls from a particular entity are intercepted for security or other lawful purposes. This is illustrated schematically in FIG. 9 which is similar to FIG. 8. Consider user A in FIG. 9 and suppose user A to be a lawful intercept target.

In order for lawful intercept to proceed a centralised resource (referred to as a centralised receptor) is used in the core network. This means that all A's calls must pass the low bandwidth link, even if those calls would not otherwise need to do so (for example, calls to user B in FIG. 9). As a result user A's calls to user B could be dropped as a result of call admissions procedures associated with the low bandwidth link. This could alert user A to the fact that lawful intercept is being used. In order to prevent this, the present invention drops another existing call to provide enough bandwidth for A's call should this be required. In that way, A's call is not dropped and A does not have reason to become suspicious. A key requirement for lawful intercept is that lawful intercept targets are not aware that calls involving them are being monitored.

In FIG. 3 the middlebox databases 33, 34 are shown as separate from the call servers 31, 32. However, this is not essential. The middlebox database may be integral with its associated call server, or it may be a separate entitiy. This is an implementation decision.

Any range or device value given herein may be extended or altered without losing the effect sought, as will be apparent to the skilled person for an understanding of the teachings herein.

The invention claimed is:

1. An admission control server for use in a packet-switched communications network, the network comprising a plurality of nodes and a plurality of links interconnecting the nodes, said server comprising:
   (i) an input configured to receive a call admission request in respect of a potential call traversing the network between two or more packet media endpoints;
   (ii) an input configured to access predetermined information about one or more of the plurality of links to be used for carrying packets comprising the potential call, the predetermined information comprising an amount of available bandwidth on said one or more of the plurality of links;
   (iii) a processor configured to determine whether to accept the potential call on the basis of the accessed predetermined information;
   (iv) an output configured to output the result of the determination of whether to accept the potential call on the basis of the accessed predetermined information.

2. A server as claimed in claim 1 wherein the processor is configured to determine whether to accept the potential call on the basis of the accessed predetermined information and information about a bandwidth requirement for the potential call.

3. A server as claimed in claim 2, wherein the bandwidth requirement for the potential call is contained in the call admission request.

4. A server as claimed in claim 2, wherein said processor is configured to examine session description protocol 'SDP' messages from at least one of said two or more packet media endpoints to derive any one or more of: the bandwidth requirement of the potential call; and which codec will be used for the potential call.

5. A server as claimed in claim 1 wherein the call admission request identifies all of the packet media endpoints of the potential call and wherein the processor is configured to determine whether respective ones of the one or more of the plurality of links for each of the identified packet media endpoints are the same and, if so, to accept the potential call.

6. A server as claimed in claim 1 wherein the call admission request identifies at least two of the packet media endpoints of the potential call and wherein the processor is configured to determine which of respective ones of the one or more of the plurality of links for each of the identified packet media endpoints are different and to determine whether to accept the potential call using the accessed predetermined information about only links that are determined to be different.

7. A server as claimed in claim 1, wherein said predetermined information comprises an estimated amount of available bandwidth on said one or more of the plurality of links.

8. A server as claimed in claim 1, wherein said server is configured to access said predetermined information in a database associated with the server.

9. A communications network comprising at least one server as claimed in claim 1.

10. A communications network as claimed in claim 9, wherein all of the packet media endpoints connected to a particular node are controlled by a same call server.

11. A method of performing admissions control in a packet-switched communications network, the network comprising a plurality of nodes and a plurality of links interconnecting the nodes, the method comprising the steps of:
   (a) receiving at a call server a call admission request in respect of a potential call traversing the network between two or more packet media endpoints;
   (b) accessing predetermined information about one or more of the plurality of links to be used for carrying packets comprising the potential call, the predetermined information comprising an amount of available bandwidth on said one or more of the plurality of links;
   (c) determining whether to accept the potential call on the basis of the accessed predetermined information; and
   (d) outputting the results of the determination of whether to accept the potential call on the basis of the accessed predetermined information.

12. A method as claimed in claim 11 wherein said step (iii) of determining comprises determining whether to accept the potential call on the basis of the accessed predetermined information and information about a bandwidth requirements for the potential call.

13. A method as claimed in claim 12, wherein the bandwidth requirement for the potential call is contained in the call admission request.

14. A method as claimed in claim 11 which further comprises determining whether respective ones of the one or more of the plurality of links for each of the identified packet media endpoints are the same and, if so, accepting the potential call in such a case.

15. A method as claimed in claim 11, wherein the call admission request identifies at least two of the packet media endpoints of the potential call and the method further comprises determining which of respective ones of the one or more of the plurality of links for each of the identified packet media endpoints are different and determining whether to accept the potential call using the accessed predetermined information about only links that are determined to be different.

16. A method as claimed in claim 11 wherein said communications network is selected from an internet protocol communications network and a asynchronous transfer mode communications network.

17. A method as claimed in claim 11 wherein two or more of said packet media endpoints are media gateways.

18. A method as claimed in claim 11 wherein said information about bandwidth requirements is derived from session description protocol 'SDP' information received from two or more of the packet media endpoints.

19. A method as claimed in claim 11 wherein said information about bandwidth requirements comprises information about one or more codecs to be used in the potential call.

20. A method as claimed in claim 11 wherein said call is a conference call to be established using a conferencing service in the communications network.

21. A method as claimed in claim 11 wherein, if the potential call is refused, an instruction is sent to an origination packet media endpoint to provide a refusal indication to a calling party terminal initiating the potential call.

22. A method as claimed in claim 11 wherein, if the potential call is accepted and the potential call proceeds, the information about an amount of available bandwidth each of the one or more of the plurality of links to be used for carrying packets comprising the potential call is updated to indicate the amounts of available bandwidth remaining assuming the potential call is in progress.

23. A method as claimed in claim 22 wherein, when the call terminates, the information about an amount of available bandwidth on each of the one or more of the plurality of links to be used for carrying packets comprising the potential call is updated to indicate the amounts of available bandwidth remaining assuming the call has terminated.

24. A method as claimed in claim 11, wherein said predetermined information comprises an estimated amount of available bandwidth on said one or more of the plurality of links.

25. A method as claimed in claim 11, further comprising accessing said predetermined information in a database associated with the call server.

\* \* \* \* \*